United States Patent [19]

Levine

[11] Patent Number: 4,551,762
[45] Date of Patent: Nov. 5, 1985

[54] DARK-CURRENT LEVEL REGULATION IN SOLID-STATE DEVICES

[75] Inventor: Peter A. Levine, Mercer County, N.J.

[73] Assignee: RCA Corporation, Princeton, N.J.

[21] Appl. No.: 571,719

[22] Filed: Jan. 18, 1984

[51] Int. Cl.[4] .............................................. H04N 5/16
[52] U.S. Cl. ................................... 358/221; 358/213; 358/280
[58] Field of Search ............... 368/211, 212, 213, 221, 368/222, 100, 280; 357/22, 30, 24 LR

[56] References Cited

U.S. PATENT DOCUMENTS 3,737,571 6/1973 Gaebele et al. ..................... 358/221
4,074,324 2/1978 Barrett ................................ 358/296

FOREIGN PATENT DOCUMENTS 2408918 9/1975 Fed. Rep. of Germany ...... 358/221
2815342 10/1979 Fed. Rep. of Germany ...... 358/221
53-123617 10/1978 Japan .................................. 358/221
923817 4/1963 United Kingdom ................ 358/100
1246416 9/1971 United Kingdom ................ 358/100

Primary Examiner—Gene Z. Rubinson
Assistant Examiner—Robert Lev
Attorney, Agent, or Firm—Joseph S. Tripoli; George E. Haas; Allen LeRoy Limberg

[57] ABSTRACT

Output signal samples provided from a solid-state imager, responsive to dark current accumulated in its CCD registers, are supplied to circuitry for measuring dark current noise level. The measured level is compared to a reference value for generating an error signal controlling the application of power to a thermoelectric cooler cooling the solid-state imager. The imager is cooled sufficiently to reduce dark current generation. A servomechanism for keeping dark current level acceptably low with minimal power consumption by the thermoelectric cooler is thus provided.

11 Claims, 6 Drawing Figures

DARK-CURRENT LEVEL REGULATION IN SOLID-STATE DEVICES

The present invention relates to solid-state devices (such as imagers) cooled to reduce dark current levels and, more particularly, to a better method of measuring the temperature of a semiconductor die on which a solid state device is formed, useful in implementing thermal servomechanisms to regulate die temperature.

BACKGROUND OF THE INVENTION

S. L. Bendell in his U.S. Pat. App. Ser. No. 532,958 filed Sept. 16, 1983, entitled "TELEVISION CAMERA WITH SOLID STATE IMAGERS COOLED BY A THERMAL SERVO" and assigned to RCA Corporation, describes the cooling of solid-state imagers to prescribed temperatures. These temperatures are low enough that the dark currents on all solid-state imagers within specification are reduced sufficiently that noise attributable to dark current variations is kept below acceptable limit in television pictures produced from the output signals of those imagers. In the back-illuminated thinned-substrate CCD imagers presently manufactured by RCA Corporation, cooling the solid-state imager from normal operating temperature down to 10° C. will reduce noise attributable to dark current variations fourfold, to levels comparable to noise from other sources. This cooling need is much more modest than the need for cooling to liquid nitrogen temperatures, as required with visible light sensing CCD imagers used in astronomical observations and similar applications, or with infrared-sensing CCD imagers. Cooling can be done satisfactorily with thermoelectric coolers bonded to the CCD imagers. The particular of bonding a thermoelectric cooler to a CCD imager to avoid condensation on the imager surface exposed to illumination are described by P. D. Southgate in his U.S. Pat. App. Ser. No. 532,957 filed Sept. 16, 1983, entitled "CAMERA WITH REDUCED-CONDENSATION COOLED CCD IMAGER", and assigned to RCA Corporation.

The sensing of the temperature of the solid-state imager was carried out in the previous apparatus using the potential drop across a forward-biased semiconductor junction located on the same semiconductor die as the imager. Complications in the processing of the semiconductor die are introduced by the need to avoid injection of charge carriers by the forward-biased junction into the imager, and it is impractical to locate the forward-biased junction in the central portions of the imager where one would prefer to sense temperature. Also, this method senses temperature at a point on the chip, rather than over an entire area where the dark currents of concern are generated. Also, there is a problem of providing an extra pin on the imager package to access the sensor output signal.

The present inventor in his U.S. Pat. No. 4,496,982 issued Jan. 29, 1985, entitled "COMPENSATION AGAINST FIELD SHADING IN VIDEO FROM FIELD-TRANSFER CCD IMAGERS" and assigned to RCA Corporation, and D. D. Crawshaw in his U.S. Pat. No. 4,498,105 issued May 2, 1985, entitled "FIELD TRANSFER CCD IMAGERS WITH REFERENCE BLACK-LEVEL GENERATION CAPABILITY", and assigned to RCA Corporation describe various ways of sensing accumulated dark current on a semiconductor die into which a CCD imager is integrated. Accumulated dark current can be extracted from the imager in several ways through pins already existent on the imager package for other purposes. Accumulated dark current increases in a known way with temperature, doubling for every 10° C. or so increase in temperature in a silicon device. The accumulated dark current can be used to meter temperature change, rather than using a forward-biased semiconductor junctions, thereby to improve the thermal servomechanism described in S. L. Bendell's U.S. Pat. App. Ser. No. 532,958. A thermal servomechanism so improved conserves the power needed for cooling, reducing the cooling when the imager is operated in inherently cooler surroundings or is exposed to less radiant energy.

But, the ultimate goal of cooling the solidstate imager is to limit the level of dark current variations. The level of the dark current variations from picture element to picture element (i.e. from pixel to pixel) in a well-made modern solid-state imager is substantially linearly related to the average dark current level, over extensive time and over an extensive number of pixels, since these variations are essentially Johnson noise. One can measure average dark current level by sensing accumulated dark current along the lines described or suggested in U.S. Pat. No. 4,496,982, then use the measurement to control the amount of cooling applied to the solid-state imager. This allows regulating directly for constant average dark current level, and thus indirectly for constant noise owing to variations in dark current level, rather than regulating for constant imager temperature.

Indeed, regulating for constant average dark current level is a preferable way to control the temperature of the solid-state imager. One finds variations by a factor of two to three in dark current levels from one solid-state imager to another—owing, for example, to variation in the crystalline structure of the semiconductor substrate and to variations in the processing to emplace an imager on the substrate. Regulating for a prescribed dark current level, rather than a prescribed imager temperature, means that imagers with inherently less dark current and less attendant variation in dark current level automatically will be provided with less cooling. Reducing cooling reduces power consumption in the camera, and it prolongs battery life in a battery-powered camera. When one replaces the imager in a camera, there is no need to adjust temperature to reduce dark current or to minimize power consumption for satisfactorily low dark current noise. Further, there is uniformity from camera to camera across a product line, which lessens the likelihood of customer returns for "unsatisfactory" dark current performance as compared to another camera of the same type. In broadcasting service, switches from camera to camera are less likely to be noticeable.

The measurement of dark current generated in a charge coupled device array of the size of an imager field storage register can provide temperature measurement with resolution to millidegrees Celsius. Each dark-current charge accumulating location in a CCD area array of a size similar to a location in a CCD imager field storage (B) register over a 1/60 second period can accumulate on average 2,000 electrons at room temperature. This 2000 electron average has about 40 electrons r-m-s noise variation from location to location. When the respective 2,000 electrons charge contributions from an array of locations n in number are merged, these contributions add arithmetically to give 2000n electrons. A full-well charge of 200,000 electrons can be provided by 100 dark-current charge accumulating locations. The 40 electrons r-m-s noise from each location adds vectorially to $40(n)^{(\frac{1}{2})}$ electrons r-m-s or 400 electrons r-m-s over 100 locations. The number of accumulated electrons doubles each eight degrees Celsius. In the eight degrees up to room temperature half the full-well charge of 200,000 electrons is accumulated with this 40 electrons r-m-s noise, so temperature resolution is 8° C./(100,000/400) or 32 millidegrees Celsius, which is good for the short sampling period and improves as temperature increases. So, then, a moderate-size CCD area array of 100 locations or so can be placed on any semiconductor die the temperature of which is to be regulated, and used to sense die temperature for the thermal regulation loop.

SUMMARY OF THE INVENTION

An aspect of the invention is the measurement of the temperature of a semiconductor die by accumulating dark current charge from a CCD array on that die. A further aspect of the invention is using that measurement to derive an error signal for a thermal servomechanism regulating the temperature of the semiconductor die.

The invention is embodied in a camera having a solid-state imager and a cooler for the imager, supplying cooling controlled in response to accumulated dark current from the imager. In preferred embodiments of the invention the accumulated dark current from the imager is regulated to constant prescribed level.

DETAILED DESCRIPTION

Figure 1:
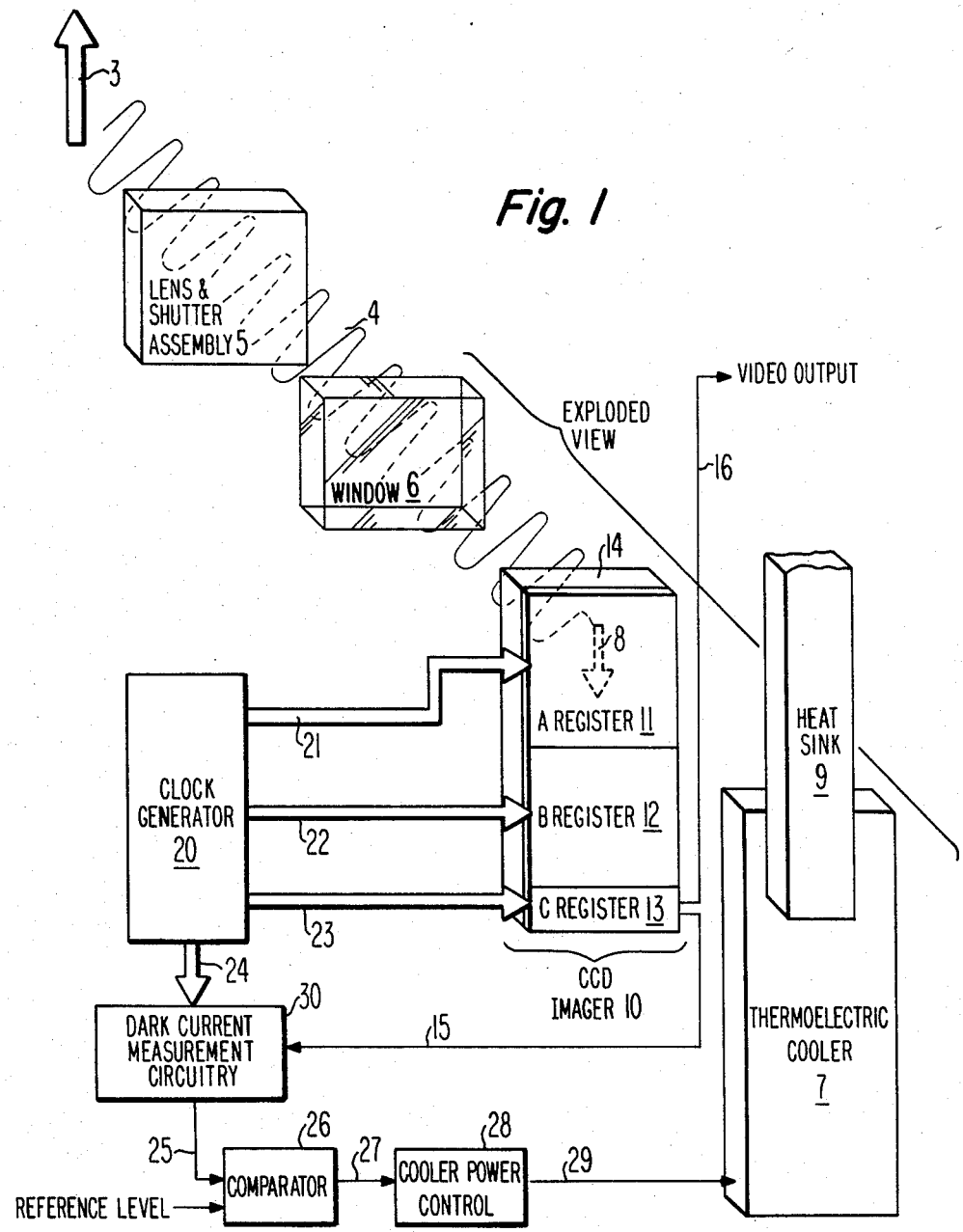
FIG. 1 shows portions of a CCD camera with thermoelectric cooler in exploded view and shows a block schematic of the electronics for operating that thermoelectric cooler to control dark current noise in accordance with the invention.

In the CCD camera of FIG. 1, light transmitted from or reflected by an object 3 external to the camera follows a light transmission path 4, through the camera lens and shutter assembly 5, through a window 6 in a housing (not shown) surrounding a CCD imager 10 and an associated thermoelectric cooler 7, and to CCD imager 10. The transmitted light projects an image 8 through the back surface of that CCD imager 10. The portion of the CCD imager 10 into which image 8 is projected is behind the front surface gate electrodes defining an image (or A) register 11. CCD imager 10 is shown as a field transfer type having, in addition to its image register 11, a field storage (or B) register 12 and an output line (or C) register 13. The C register converts charge packets, supplied to it a row at a time during line retrace intervals, into output signal samples supplied serially during line trace intervals. C register 13 is considered, per convention, to include output circuitry for converting charge to output signal current or voltage samples. A common type of output circuitry employs a floating diffusion in the C register 13 charge transfer channel, the charge under the floating diffusion biasing the gate electrode of a field effect transistor to form an electrometer. Registers 11, 12, and 13 of CCD imager 10 occupy portions of a thinned semiconductor substrate which are bonded to a transparent backing plate 14. A mask (not visible in FIG. 1) keeps light from falling on the portion of the semiconductor substrate occupied by B register 12 and C register 13 (and typically the last few rows of A register 11).

The front surface of back-illuminated CCD imager 10 on which the gate electrodes for its A register 11, B register 12, and C register 13 are disposed has a protective glaze and is thermally connected (e.g. by bonding with thermally conductive epoxy) to thermoelectric cooler 7. Cooler 7 in turn may have a thermal connection to a heat sink 9, such as a copper bar, as shown, or copper braid. The thermal connection may be via intervening package material (not shown in FIG. 1), but in any case thermoelectric cooler 7 (shown exploded from imager 10) will normally be proximate to imager 10 to facilitate thermal conduction from imager 10 to cooler 7. Details of the way in which a CCD imager 10 has been used together with a thermoelectric cooler 7 so as to avoid problems of condensation on window 6 are available in U.S. Pat. App. Ser. No. 532,957.

A clock generator 20 supplies clocking signals via busses 21, 22 and 23 to A register 11, B register 12 and C register 13 respectively. The clocking signals may be uni-phase, bi-phase or poly-phase in nature. During field transfer times, which occur within field retrace intervals, A register 11 and B register 12 are clocked in synchronism to transfer accumulated image samples from locations in the image (or A) register 11 array of picture elements (pixels) to corresponding locations in the field storage (or B) register 12. During each such field transfer interval, remnant charge owing to accumulated dark current is clocked out of B register 12 and then clocked through the CCD portion of C register 13 at high rate to its electrometer portion. The electrometer converts the charge packets to respective CCD imager output voltage samples, to be supplied from an output connection 15 of CCD imager 10.

The samples decrease in amplitude line-by-line since dark current accumulation has proceeded over a smaller fraction of the previous field in each successive line. Consequently, during field transfer intervals the envelope of the output voltage samples, has a staircase waveform. During the ensuing field trace interval clocking is halted in A register 11 to allow the accumulation of a new array of pixel samples. The charge packets descriptive of pixel samples which have been transferred into B register 12 are all clocked forward one row during each line retrace interval. The final row in B register 12 is clocked forward to load in parallel into the CCD portion of C register 13. C register 13 has its CCD portion read out serially at pixel scan rate during line trace intervals to its electrometer portion, which responds to supply samples of video signal output at the CCD imager output connection 16. The clocking of CCD imager 10 is just described is essentially conventional in nature. (Although imager 10 is shown as having two output connections, 15 and 16, to conserve pins on the CCD imager a single output connection can be externally gated to supply the same signals for further processing.)

In the present invention the remnant dark current charge read out of the B register 12 through the C register 13 to imager output connection 15 during the field transfer interval is supplied to measurement circuitry 30. Circuitry 30 measures the integrated value of the remnant dark current charge, responsive to timing pulses supplied to it from clock generator 20 via control line 24. The measurement response from circuitry 30 is applied via connection 25 to a comparator 26 for comparison against a reference level to develop an error signal. This error signal is applied via connection 27 to cooler power control 28 controlling via connection 29 the flow of power to thermoelectric cooler 7, to complete a degenerative feedback loop to regulate the cooling of CCD imager 10. Preferably imager 10 is cooled to reduce dark current below a prescribed average level, as determined by the reference level applied to comparator 26.

Figure 2:
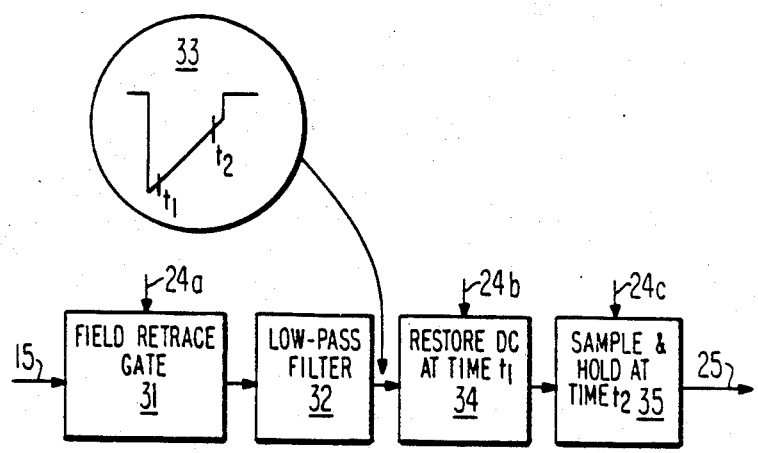
FIGS. 2, 3 and 4 are block schematics of respective apparatus for measuring the remnant dark current in the B register of a CCD imager of field transfer type in accordance with aspects of the invention.

FIG. 2 shows details of how the remnant dark current measurement circuitry 30 may be constructed in one embodiment of the invention. Responsive to a gate pulse supplied via control line 24a from clock generator 20, the field retrace gate 31 selects the staircase voltage response to the dark current signal clocked out of CCD C register 13 to appear on connection 15 during field retrace intervals, separating it from any signals appearing on connection 15 during field trace intervals. The selected staircase voltage response is supplied as input signal to a low-pass filter 32, which integrates out the line-to-line steps to leave a ramp signal. This ramp signal, shown in the circled inset 33, is supplied to a d-c restorer 34. This ramp signal, which recurs every field retrace, has a steep pull-down portion followed by a gentler ramp-up portion. The ramp signal may be superposed on an offset pedestal, as shown, which pedestal is caused by light leakage under the edge of the light mask that covers the B register 12 and C register 13 of CCD imager 10. If the CCD imager 10 is unshuttered during field retrace, down-going spikes of response to transfer smear (not shown) appear on the leading and trailing portions of the ramp signal.

At time $t_1$, occuring a short time after the steep pull-down portion of the ramp signal, d-c restorer 34 responds to a pulse supplied from clock generator 20 via connection 24b to clamp the value of the ramp at that time to a signal ground potential. The ramp signal linearly becomes more positive after time $t_1$ until a time somewhat after $t_2$, as decreasing remnant integrated dark current is clocked out of B register 12, through C register 13, and through low-pass filter 32 and d-c restorer 34. The d-c restored ramp from d-c restorer 34 is supplied as input signal to a sample-and-hold circuit 35 which responds to a pulse supplied from clocking generator 20 via control line 24c. The circuit 35 samples the ramp at time $t_2$ and holds the sampled voltage as the resulting measurement of dark current on connection 25 for the following field trace interval. Sampling at time $t_2$ obtains the largest dark current response available without detecting the offset pedestal on which the dark current ramp is superposed. The held voltage is then compared in FIG. 1 against a reference level voltage in comparator 26, which takes the form of a voltage comparator, to generate the error signal forwarded to cooler power control 28.

The just described technique of d-c restoration followed by sample-and-hold for generating error signal will eliminate any shift of base line in the signal supplied on CCD imager 10 output connection 15 owing to light leakage under the CCD imager light mask. The technique can eliminate response to the transfer smear spikes caused by operating the camera open-shutter during field retrace.

Figure 3:
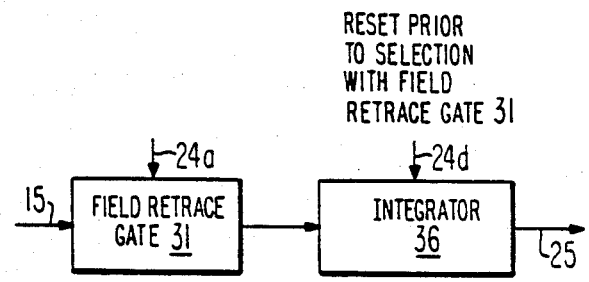

FIG. 3 shows remnant dark current measurement circuitry which may be used instead of the FIG. 2 circuitry when the mask shielding B register 12 and C register 13 from light allows no appreciable light leakage into B register 12. Field retrace gate 31 selectively applies the voltage staircase (supplied via output connection 15 in response to remnant dark current being clocked from B register 12 during field retrace) to an integrator 36. Integrator 36 is supplied a reset pulse from clocking generator 20 via control line 24d at the conclusion of each field trace interval. Then, throughout the ensuing field trace interval, integrator 36 supplies to connection 25 a voltage which measures the remnant dark current clocked from B register 12 during a field retrace interval. Variations of this voltage during field retrace intervals are suppressed by the thermal time constant of thermoelectric cooler 7.

Figure 4:
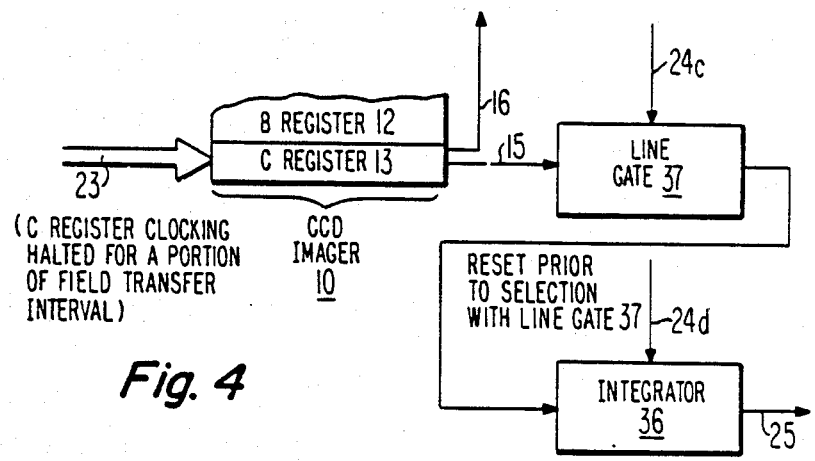

FIG. 4 shows a portion of the dark current transferred from the B register 12 to C register 13 during field transfer being integrated by accumulation in C register 13. This accumulation takes place responsive to the C register 13 clocking being halted when those lines of dark current samples are being transferred from B register 12. (C register 13 clocking can be halted after the first few rows of remnant charge are read out, if they are contaminated by transfer smear spikes owing to CCD imager 10 being unshuttered during field retrace). This practice of halting C register clocking is advantageous in that the level of integrate dark current is built up in the C register 13 charge transfer channel prior to its sensing in the electrometer stage at C register 13 output, thus avoiding error in the charge sensing operation. Charge sensing can be done and C register 13 clocking resumed before field transfer is completed, accumulating only the earlier rows of remnant charge clocked out of B register 12. The number of lines of remnant dark current clocked into C register 13 from B register 12 before C register 13 clocking is resumed can thus be selected to avoid overloading of the charge sensing electrometer stage with the increased amplitude of sensed charge. (Where CCD imager 10 is operated unshuttered during field retrace, charge sensing before field transfer is completed will avoid response to the transfer smear spike at the end of field transfer). When C register 13 clocking is resumed and the line of sample response to the row of dark current accumulated in register 13 is transferred out of CCD imager 10 via output connection 15, a line gate 37 responds to a pulse supplied to it via control line 24e from clock generator 20 to transmit this line of dark current samples to integrator 36. Integrator 36 responds to this line of dark current samples to generate the signal indirectly measuring the dark current noise accompanying CCD imager 10 output signal.

With a field transfer CCD imager 10 having the the rows of charge in the end of B register 12 remote from A register 11 clocked out earlier in field trace (rather than later as in other possible configurations), the accumulated dark current clocked out during retrace includes a greater contribution of dark current from the portions of B register 12 closer to A register 11. This means the greatest sensitivity to dark current is towards the center of the imager, near to A register 11; and measured dark current is a better index of the average temperature of the CCD imager 10 semiconductor die than output from a temperature sensing device located alongside the A or B register.

Figure 5:
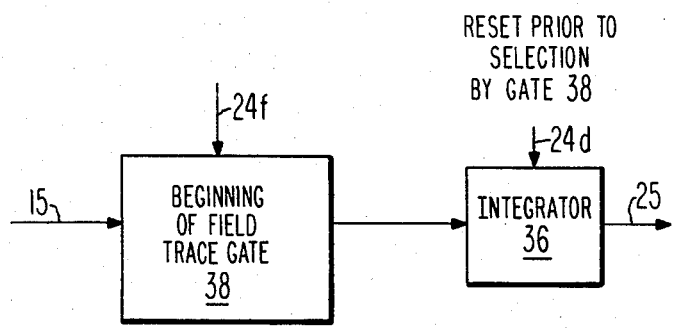
FIG. 5 is a block schematic of apparatus for measuring the dark current accumulated in masked rows of the A register in accordance with an aspect of the invention.

FIG. 5 shows an arrangement, which can be used in a CCD camera shuttered during field transfer. This arrangement allows the integration of dark current accumulated in masked portions of the A register 11, normally those last few rows of A register 11 near B register 12. These last few rows of charge transferred to the B register 12 during field retrace are the first to be clocked out of B register 12 into C register 13. A gate 38 responds to a pulse, supplied from clock generator 20 via control line 24f during one or more of the earlier lines in field trace, to select as the input for integrator 36 the accumulated dark current originating in those masked rows of A register 11. This may be done by clocking the C register as during the rest of line trace. Or it may be done by halting clocking of the C register until a later line trace, to permit accumulation of charge in C register 13 and thus increase the amplitude of the signal selected by gate 38 as input to integrator 36. In either case, this general approach requires that the light mask for the CCD imager 10 permit very little light to creep under its edge overlying the A register. If this approach is taken, it is best to use a mask deposited on the back surface of the thinned semiconductor substrate on which CCD imager 10 is formed.

Consider the ways output signals may be taken from C register 13 of imager 10. Although two outputs from C register 13 are shown, it is possible to use an imager with a single video output signal. Field retrace gate 31 or line gate 37 receptive of such signal will separate the signal required for indirect measurement of dark current noise and the gate can be made of a type where the non-selected portions of the video output signal are supplied to an ensuing processing amplifier for insertion of synchronizing pulses (and of equalization pulses, if such are used). Output signal may be taken from the final drain connection in the C register 13, and the accumulated dark current measured during field retrace then relates to full well charge, without involving the conversion gain of a electrometer stage or the flicker noise associated with the field effect transistor in such a stage.

Alternatively, as assumed in the foregoing descriptions of FIGS. 1-5, output signal can be taken from C register 13 with a floating gate or floating diffusion stage using a field effect transistor as an electrometer for converting charge amplitude to a voltage (or current) signal. The gain of the electrometer is then a factor in the measurement of dark current noise, as well as a factor in the ratio of output video signal amplitude to full well charge in the CCD registers. In such arrangements the electrometer output signal is preferably synchronously detected at a harmonic of C register 13 clocking frequency to suppress the flicker noise of the field effect transistor.

Figure 6:
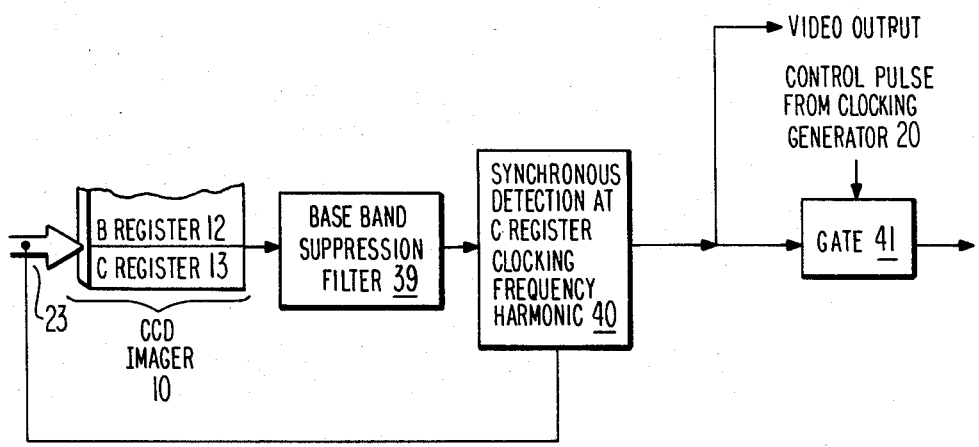
FIG. 6 is a block schematic of a variation that can be introduced in connection with the apparatus of FIGS. 1-5.

FIG. 6 shows an output connection of CCD imager 10 where such synchronous detection is done by a sample-and-hold circuit 40. Sample and hold circuit 40 follows a high-pass filter 39 that suppresses baseband frequency spectrum in the CCD imager 10 output signal. The output signal of sample-and-hold circuit 40 is then used as input signal for a gate 41 which corresponds to gate 31 of FIG. 2, gate 31 of FIG. 3, gate 37 of FIG. 4 or gate 38 of FIG. 5.

While with cooling of the CCD imager to suppress dark current noise, field shading attributable to dark current is no longer a problem, it may be desirable to allow thermoelectric cooling to be discontinued to conserve power under certain conditions. Line-to-line differences in black level over a field, as dark current noise increases line by line, causes the field shading. This field shading can, as the present inventor has previously described in the above-referenced U.S. Pat. No. 4,496,982, be compensated by generating a compensating signal proceeding from measured dark current. If this is done, the same apparatus described herein for measuring dark current can be used in the generation of field shading compensation.

The present invention is also applicable to front-illuminated imagers having their back surfaces cooled by thermoelectric coolers. Such an arrangement would be used with CCD imagers of interline transfer type, for example. Normally, a CCD imager of interline transfer type is not clocked during field retrace. Clocking it during field retrace to implement the present invention will remove dark current charge accumulated during the previous field, tending to introduce a top-to-bottom field shading into the image response in the subsequent field. This tendency can be tolerated, however, since cooling of the imager reduces the dark current that generates the field shading sufficiently that the field shading is negligibly small Alternatively, the CCD imager of interline transfer type may be provided extra columns shielded from light and not provided charge from photosensing elements; and the accumulated dark current can be removed during line retrace intervals and integrated to provide signal indirectly measuring dark current noise. This technique can be used with CCD imagers of field transfer type as well. But this technique is a less preferred embodiment of the invention in that dark current sensing is localized on the side(s) of the imager, rather than being distributed across the breadth of the imager. Also, in the interest of conserving imager die area, one does not wish to dedicate substantial portions of the area solely to dark current measurement.

What is claimed is:

1. A television camera comprising:

a solid-state imager having therein one or more area registers for holding at times charge samples descriptive of a received image, in at least a portion of which said one or more area registers at other times charge samples are to be found descriptive only of accumulated dark current;

thermoelectric cooling means for cooling said solid-state imager;

means for controlling the amount of power supplied to said thermoelectric cooler in response to an error signal, whereby the temperature of said solid-state imager is modified and consequently the dark current generated within said solid-state imager is accordingly modified;

means, responsive to the charge samples descriptive of the received image, for obtaining a video output signal from said imager;

dark current measurement means, responsive to the charge samples descriptive only of accumulated dark current, for obtaining a signal representing the level of dark current noise accompanying said video output signal;

means for comparing, against a reference value, the signal representing the level of dark current noise accompanying said video output signal to generate said error signal; and means applying said error signal to said means for controlling the amount of power supplied to said thermoelectric cooler, for completing a regulatory feedback loop to limit the amplitude of said dark current noise.

2. A television camera as set forth in claim 1 wherein said solid state imager is a CCD imager having as a said area register a field storage register into which image samples are transferred during field retrace and from which image samples are subsequently transferred during field trace.

3. A television camera as set forth in claim 2 wherein said CCD imager has, in addition to said field storage register,
  an output line register, into which output line register samples stored in rows within said field storage register are transferred in parallel a row at a time, one row in each of a series of line retrace intervals, and from which serial response is provided during the line trace intervals following those line retrace intervals—and wherein said means for indirectly obtaining a signal measuring the level of dark current noise accompanying said video signal comprises:
  a gate for selecting portions of said serial response supplied from said output line register during the portion of field retrace when image samples are transferred to said field storage register; and
  an integrator, reset prior to the beginning of that portion of field retrace, for integrating the selected portions of the serial response supplied from said output line register, thereby to complete the obtaining of said signal measuring the level of dark current noise accompanying said video signal.

4. A television camera as set forth in claim 2 wherein said CCD imager has, in addition to said field storage register,
  an output line register, into which output line register samples stored in rows within said field storage register are transferred in parallel a row at a time, one row in each of a series of line retrace intervals except those line retrace intervals during a portion of each field retrace interval, and from which serial response is provided during the line trace intervals following those line retrace intervals—and wherein said means for indirectly obtaining a signal measuring the level of dark current noise accompanying said video signal comprises:
  a gate for selecting portions said serial response supplied from said output line register during the first line after said portion of each field retrace interval, and
  means for integrating the serial response provided during the first line after said portion of each field retrace interval, and
  means for retaining the integrated serial response through at least a substantial portion of the ensuing field trace interval, thereby to complete the obtaining of said signal measuring the level of dark current noise accompanying said video signal.

5. A television camera as set forth in claim 1 wherein said solid state imager is a CCD imager having:
  an image register as a said area register wherein lies said portion of which one or more area registers wherein at other times are to be found said charge samples descriptive only of accumulated dark current, said portion being a masked portion of that image register; and
  a field storage register, into which image samples are transferred from said image register during field retrace, and from which said image samples are transferred in parallel one line at a time during each of a succession of line traces field trace.

6. A television camera as set forth in claim 5 wherein said CCD imager has, in addition to said image register and field storage register,
  an output line register, into which output line register samples stored in rows within said field storage register are transferred in parallel a row at a time, one row in each of a series of line retrace intervals, and from which serial response is provided during the line retrace intervals following those line retrace intervals; and wherein said means for indirectly obtaining a signal mesuring the level of dark current noise accompanying said video output signal comprises:
  a gate for selecting that portion of said serial response which is the response to samples from the masked portion of said image register and
  an integrator, reset prior to selecting by said gate, for integrating the selected portion of said serial response, thereby to complete said obtaining of a signal measuring the level of dark current noise accompanying said video output signal.

7. A method of measuring the temperature of a semiconductor die having disposed thereon a charge coupled device array shielded from incident radiation, said method comprising the steps of:
  shielding the charge coupled device array from incident radiation;
  recurrently removing dark current response from said charge coupled device array in respective successions of samples,
  integrating each said succession of integrated removed dark current response samples for accumulating an integrated removed dark current response as a temperature measurement, which integrated removed dark current response has an amplitude substantially equal to the summation of the amplitudes of the removed dark current response samples in the succession integrated.

8. In combination:
  a semiconductor die having electronic apparatus integrated therewith including a charge coupled device array shielded from incident radiation;
  means for removing dark current charge samples from said charge coupled device array at prescribed rate;
  means for changing the temperature of said semiconductor die in an amount controlled by an electric control signal; and
  means for generating said electric control signal responsive to the amount of dark current charge removed from said charge coupled device per unit of time, to complete a servomechanism for maintaining the temperature of said semiconductor die substantially constant.

9. A method of measuring packets of charge dispersed among the successive charge transfer stages of each of a plurality of charge-coupled-device charge transfer channels in a parallel array, having gate electrodes thereover for receiving clocking signal voltages, which method of measuring uses a charge-coupled-device shift register and a charge sensing stage receiving its input charge packets from an output stage of said charge-coupled-device shift register, said charge-coupled-device shift register having a succession of charge transfer stages therein, each of which charge transfer stages is disposed to receive charge packets transferred from the output port of a respective one of said charge transfer channels, said method comprising the steps of:

provautomatic recurrent halts in shift register operation in said charge-coupled-device shift register to leave its charge transfer stages in condition to receive charge packets from the output ports of said charge transfer channels;

during said recurrent halts in shift register operation, applying a forward clocking signal to the gate electrodes over said parallel array of charge-coupled-device charge transfer channels, to transfer charge packets through them and from their output ports;

during said recurrent halts in shift register operation, accumulating the successive charge packets transferred from the output port of each one of said charge transfer channels, the accumulating being done in the one of the charge transfer stages in said charge-coupled-device shift register respectively receiving charge packets from the output port of that charge transfer channel, thereby to integrate the successive charge packets that the charge transfer stages respectively receive from respective ones of the output ports of said charge transfer channels array and to generate an integrated charge packet in each of said succession of charge transfer stages in said charge-coupled-device shift register; and after each of said recurrent halts in shift register operation during which successive charge packets received by the charge transfer stages of said charge-coupled-device shift register are integrated, resuming shift register operation in said charge-coupled-device shift register to transfer serially each integrated charge packet in its succession of charge transfer stages to said charge sensing stage.

10. A method of measuring packets of charge as set forth in claim 9 including the additional step of:

integrating the response of said charge transfer stage to each serial transfer of integrated charge packets thereto from the succession of charge transfer stages in said charge-coupled-device register.

11. A method of transferring charge packets, through rows of charge transfer stages in parallelly arrayed columnar charge transfer channels of a charge-coupled-device imager register shielded from irradiation, to the last of a succession of charge transfer stages in a charge-coupled-device shift register shielded from irradiation, disposed along the output ports of said parallelly arrayed columnar charge transfer channels to be supplied from the last charge transfer stage of said charge-coupled-device shift register in serial-in-time format, said method comprising the steps of:

halting charge-coupled-device shift register operation during the transferring of charge packets through the rows of charge transfer stages;

applying, during the transferring of the charge packets through the rows of charge transfer stages, a plurality of cycles of forward clocking signal to the gate electrodes disposed over said parallelly arrayed columnar charge transfer channels;

accumulating in each of said succession of charge transfer stages in said charge-coupled-device shift register, the charge packets transferred thereto from the output port of a respective one of said columnar charge transfer channels; and resuming shift register operation in said charge-coupled-device shift register after transferring the charge packets through the rows of charge transfer stages in said parallelly arrayed columnar charge transfer channels, to supply the charge packets serially from the shift register output port.

* * * * *